United States Patent
Onogi et al.

(10) Patent No.: US 11,473,218 B2
(45) Date of Patent: Oct. 18, 2022

(54) MODIFIED ETHYLENE-VINYL ALCOHOL COPOLYMER FIBERS

(71) Applicant: KURARAY CO., LTD., Okayama (JP)

(72) Inventors: Shoji Onogi, Kurashiki (JP); Hitoshi Nakatsuka, Kurashiki (JP); Shinya Kawakado, Kurashiki (JP); Takayuki Ikeda, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 302 days.

(21) Appl. No.: 16/766,895

(22) PCT Filed: Dec. 20, 2018

(86) PCT No.: PCT/JP2018/047099
§ 371 (c)(1),
(2) Date: May 26, 2020

(87) PCT Pub. No.: WO2019/131460
PCT Pub. Date: Jul. 4, 2019

(65) Prior Publication Data
US 2020/0362475 A1    Nov. 19, 2020

(30) Foreign Application Priority Data

Dec. 26, 2017    (JP) .............................. JP2017-249410

(51) Int. Cl.

| | | |
|---|---|---|
| *D01F 6/30* | (2006.01) | |
| *B29C 48/05* | (2019.01) | |
| *C08F 116/06* | (2006.01) | |
| *D01D 5/08* | (2006.01) | |
| B29K 23/00 | (2006.01) | |
| *D01F 6/50* | (2006.01) | |
| *D01F 6/34* | (2006.01) | |

(52) U.S. Cl.
CPC ................ *D01F 6/30* (2013.01); *B29C 48/05* (2019.02); *C08F 116/06* (2013.01); *D01D 5/08* (2013.01); *B29K 2023/086* (2013.01); *C08F 2810/20* (2013.01); *D01F 6/34* (2013.01); *D01F 6/50* (2013.01)

(58) Field of Classification Search
CPC ..... D01F 6/30; D01F 6/34; D01F 6/50; B29C 48/05; C08F 116/06; C08F 2810/20; C08F 216/06; D01D 5/08; B29K 2023/086
USPC ......................................................... 526/332
See application file for complete search history.

(56) References Cited

U.S. PATENT DOCUMENTS

2015/0152256 A1*    6/2015    Nakazawa ............ B32B 27/306
                                                                428/500

FOREIGN PATENT DOCUMENTS

| EP | 2862897 A1 | | 4/2015 |
|---|---|---|---|
| JP | S5721513 A | | 2/1982 |
| JP | S5766117 A | | 4/1982 |
| JP | 2004162189 A | * | 6/2004 |

OTHER PUBLICATIONS

16766895 JP2004162189A Machine Translation, Published Jun. 10, 2004. (Year: 2004).*
Extended European Search Report dated Jul. 29, 2020 in Application No. 18893962.3, 6 pages.
International Search Report dated Mar. 12, 2019 in PCT/JP2018/047099 (with English translation).

* cited by examiner

*Primary Examiner* — Seyed Masoud Malekzadeh
*Assistant Examiner* — Lawrence D. Hohenbrink, Jr.
(74) *Attorney, Agent, or Firm* — Element IP, PLC

(57) ABSTRACT

A modified ethylene-vinyl alcohol copolymer fiber includes an ethylene-vinyl alcohol copolymer containing 0.1 to 10 mol % of a modified component and 5 to 55 mol % of ethylene, and has a crystallinity of 25% to 50%.

4 Claims, No Drawings

MODIFIED ETHYLENE-VINYL ALCOHOL COPOLYMER FIBERS

TECHNICAL FIELD

The present invention relates to a modified ethylene-vinyl alcohol copolymer fiber suitable for thermally fusible fibers which are used to provide clothing with anti-fraying and anti-penetration properties.

BACKGROUND ART

According to a known method, fabric is fixed using a thermally fusible fiber to provide clothing, such as underwear and socks, with an anti-penetration property of protecting the clothing from penetration by a sharp object, and an anti-fraying property. Various kinds of such thermally fusible fibers have been introduced. For example, Patent Document 1 proposes a hot-melt binder fiber which is made of a polyester-based polymer having a softening point of 100° C. or higher to 150° C. or lower, and has a specific crimp rate. This binder fiber can effectively bond fibers in a fiber mold together. Patent Document 2 proposes a hot-melt adhesive fiber which is made of a copolyester having a melting point of 100° C. to 160° C., sufficiently withstands post-processing, and gives an adherend after adhesion good dry-cleaning resistance, transparency, shape retainability, and texture. However, the thermally fusible fibers of Patent Documents 1 and 2 cannot be fused and cured without a heat treatment performed at a temperature higher than 100° C., such as high-temperature and high-pressure dyeing or a heat treatment with a steam iron. This disadvantageously limits the range of use of these fibers in which the texture of the resulting fabric is not impaired.

To cope with the above problem, Patent Document 3 proposes a composite fiber made of an ethylene-vinyl alcohol copolymer (will be hereinafter sometimes abbreviated as EVOH), which is, for example, a modified ethylene-vinyl alcohol copolymer containing 0.3 mol % to 40 mol % of a modified component such as the following structural unit (I), and 5 mol % to 55 mol % of ethylene. This composite fiber has good adsorptivity, provides a comfort feeling when worn, and excellent fusion property and strength.

[Chemical Formula 1]

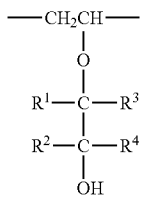

(I)

However, the modified EVOH fiber is not intended for use in clothing. Thus, a fabric made of a combination of the modified EVOH fibers and polyester or polyamide fibers may excessively shrink when set the fabric. Moreover, if a large amount of the modified component is contained in a molecular chain, the fibers gradually shrink to cause a yarn end to bury, and the fibers are fixed to each other to make unwinding of the yarn difficult, especially during storage in a high-temperature and high-humidity environment.

CITATION LIST

Patent Documents

Patent Document 1: Japanese Unexamined Patent Publication No. S57-66117
Patent Document 2: Japanese Unexamined Patent Publication No. S57-21513
Patent Document 3: Japanese Unexamined Patent Publication No. 2004-162189

SUMMARY OF THE INVENTION

Technical Problem

The present invention has been made to solve the above problems, and it is therefore an object of the present invention to provide a modified EVOH fiber which can be subjected to a fusion treatment at 100° C. or lower, shows good storage stability in a high-temperature and high-humidity environment, is fused when a fabric made of a combination of the modified EVOH fiber and a polyester or polyamide fiber is set, and allows the fabric to moderately shrink.

Solution to the Problem

Specifically, the present invention is configured as follows.

The present invention is directed to a modified ethylene-vinyl alcohol copolymer fiber including: a modified ethylene-vinyl alcohol copolymer containing 0.1 mol % to 10 mol % of the following structural unit (I), and 5 mol % to 55 mol % of ethylene, the modified ethylene-vinyl alcohol copolymer fiber having a crystallinity of 25% to 50%.

[Chemical Formula 2]

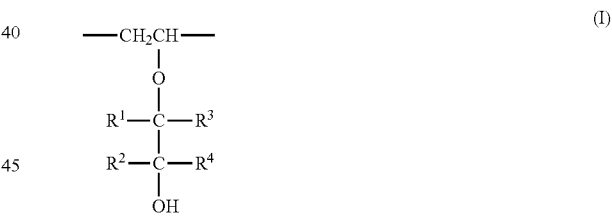

(I)

(where $R^1$, $R^2$, $R^3$ and $R^4$ represent a hydrogen atom, an aliphatic hydrocarbon group having 1 to 10 carbon atoms, an alicyclic hydrocarbon group having 3 to 10 carbon atoms, or an aromatic hydrocarbon group having 6 to 10 carbon atoms, $R^1$, $R^2$, $R^3$ and $R^4$ may be the same as or different from each other, $R^3$ and $R^4$ may be bonded to each other, and $R^1$, $R^2$, $R^3$ and $R^4$ may have a hydroxyl group, a carboxyl group, or a halogen atom).

The modified ethylene-vinyl alcohol copolymer fiber may have a crystallite size of 30 Å to 50 Å.

The modified ethylene-vinyl alcohol copolymer fiber may have a melting point of 60° C. to 160° C.

The modified ethylene-vinyl alcohol copolymer fiber may be produced by a method including: unevenly supplying a resin made of the modified ethylene-vinyl alcohol copolymer and a resin made of an unmodified ethylene-vinyl alcohol copolymer free from the structural unit (I) and containing 5 to 55 mol % of ethylene into a resin feed hopper in a melting phase during spinning.

The present invention may also be directed to a fiber structure including the modified ethylene-vinyl alcohol copolymer fiber.

Advantages of the Invention

The present invention can provide a modified ethylene-vinyl alcohol copolymer fiber that shows good storage stability in a high-temperature and high-humidity environment, achieves a fusion treatment at a low temperature equal to or lower than 100° C., and has a moderate shrink property and fusion property that keep a woven or knitted fabric from excessively shrinking at the time of setting of the fabric.

DETAILED DESCRIPTION

The present invention will be described in detail below.

It is important for the modified EVOH fibers of the present invention to contain a modified ethylene-vinyl alcohol copolymer containing 0.1 mol % to 10 mol % of a modified component and 5 to 55 mol % of ethylene, and to have a crystallinity of 25% to 50%. The amount of the modified component in the specified range makes it possible to give good spinnability to the modified EVOH fibers, control the crystallinity and melting point of the EVOH, and make the EVOH to show a sufficient fusion property even when a heat treatment is performed at low temperatures. Further, producing a fiber structure (e.g., woven or knitted fabric) using the fibers having a good fusion property makes it possible to give dimensional stability during a heat treatment, and bring the fibers forming the fiber structure to be firmly fused together. This can provide the fiber structure with anti-penetration and anti-fraying properties.

(Modified EVOH)

As the modified ethylene-vinyl alcohol copolymer used in the present invention, it is important to use a modified ethylene-vinyl alcohol copolymer containing 0.1 mol % to 10 mol % of the following structural unit (I), and 5 to 55 mol % of ethylene.

[Chemical Formula 3]

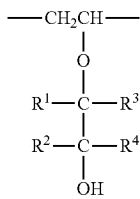
(I)

(where $R^1$, $R^2$, $R^3$ and $R^4$ represent a hydrogen atom, an aliphatic hydrocarbon group having 1 to 10 carbon atoms (such as an alkyl group or an alkenyl group), an alicyclic hydrocarbon group having 3 to 10 carbon atoms (such as a cycloalkyl group or a cycloalkenyl group), or an aromatic hydrocarbon group having 6 to 10 carbon atoms (such as a phenyl group), $R^1$, $R^2$, $R^3$ and $R^4$ may be the same as or different from each other, $R^3$ and $R^4$ may be bonded to each other (unless $R^3$ and $R^4$ are both hydrogen atoms), and $R^1$, $R^2$, $R^3$ and $R^4$ may have other groups, e.g., a hydroxyl group, a carboxyl group, or a halogen atom).

In the structural unit (I), both of $R^1$ and $R^2$ are preferably hydrogen atoms. More preferably, both of $R^1$ and $R^2$ are hydrogen atoms, one of $R^3$ or $R^4$ is an aliphatic hydrocarbon group having 1 to 10 carbon atoms, and the other is a hydrogen atom. Still more preferably, the aliphatic hydrocarbon group is an alkyl group or an alkenyl group. Particularly preferably, both of $R^1$ and $R^2$ are hydrogen atoms, one of $R^3$ or $R^4$ is a methyl group or an ethyl group, and the other is a hydrogen atom. This makes it possible to obtain fibers which are easily fused with polyester fibers and polyamide fibers.

It is also preferable that one of $R^3$ or $R^4$ is a substituent represented by $(CH_2)_iOH$ (where i is an integer of 1 to 8), and the other is a hydrogen atom. In the substituent represented by $(CH_2)_iOH$, i is more preferably an integer of 1 to 4, still more preferably 1 or 2, particularly preferably 1. This makes it possible to obtain fibers which are easily fused with polyester fibers and polyamide fibers.

The modified EVOH used in the present invention needs to contain 0.1 mol % to 10 mol % of the structural unit (I). The content of the structural unit (I) is preferably 0.5 mol % or more, more preferably 2 mol % or more, and still more preferably 3 mol % or more. Further, the content of the structural unit (I) is preferably 9 mol % or less, more preferably 6 mol % or less, and still more preferably 5 mol % or less. The content of the structural unit (I) within the above-described range makes it possible to obtain composite fibers having good spinnability and fusion property. If the content of the structural unit (I) falls below 0.1 mol %, the fusion property is deteriorated. If the content exceeds 10 mol %, the spinnability becomes poor due to high elastic recovery rate derived from a high content of the modified component, and additionally, the melting point and crystallinity of the obtained fibers are lowered. This results in poor storage stability because the fibers are fixed to each other during storage.

The ethylene content of the modified EVOH used in the present invention needs to be 5 mol % to 55 mol %. From the viewpoint of obtaining good spinnability, the ethylene content of the modified EVOH is suitably 15 mol % or more, more suitably 25 mol % or more. Further, from the viewpoint of obtaining good fusion property and storage stability, the ethylene content of the modified EVOH is suitably 50 mol % or less, more suitably 45 mol % or less. If the ethylene content falls below 5 mol %, a melt molding property and spinnability are deteriorated. If the ethylene content exceeds 55 mol %, the resin becomes excessively hydrophobic, which impairs the fusion property with polyester fibers and polyamide fibers.

Another component of the modified EVOH except for the structural unit (I) and the ethylene unit is mainly a vinyl alcohol unit. The vinyl alcohol unit is usually a vinyl alcohol unit that has not reacted with a monovalent epoxy compound described below, among vinyl alcohol units contained in EVOH which is a raw material. In addition, an unsaponified vinyl acetate unit which may be contained in EVOH is usually contained in the modified EVOH as it is. Results of measurements of NMR and melting point have revealed that the modified EVOH is a random copolymer containing these components. The modified EVOH may further contain additional components within a range which does not impair the object of the present invention.

A melt flow rate (MFR) (at 190° C., under a load of 2160 g) of the modified EVOH is suitably 0.1 g/10 min to 30 g/10 min, more suitably 0.3 g/10 min to 25 g/10 min, much more suitably 0.5 g/10 min to 20 g/10 min. However, if the melting point is around or above 190° C., the measurement is performed at different temperatures equal to or higher than the melting point under a load of 2160 g, and reciprocals of the absolute temperatures and a logarithms of the MFRs are respectively plotted on horizontal and vertical axes of a semilog graph to represent the MFR as a value extrapolated to 190° C.

The modified EVOH may be produced by any method without particular limitations. For example, a modified EVOH can be obtained by reacting an ethylene-vinyl alcohol copolymer with a monovalent epoxy compound having a molecular weight of 500 or less.

The EVOH used as a raw material for the modified EVOH in the present invention may preferably be EVOH obtained through saponification of an ethylene-vinyl ester copolymer. A typical vinyl ester used in the production of EVOH is vinyl acetate, but other fatty acid vinyl esters (such as vinyl propionate and vinyl pivalate) can also be used. Further, within a range which does not impair the object of the present invention, other comonomers, for example: α-olefins such as propylene, butylene, isobutene, 4-methyl-1-pentene, 1-hexene, and 1-octene; unsaturated carboxylic acids such as (meth)acrylic acid, methyl (meth)acrylate, and ethyl (meth)acrylate or esters thereof; vinyl silane-based compounds such as vinyl trimethoxy silane; unsaturated sulfonic acid or salts thereof; alkylthiols; and vinyl pyrrolidone such as N-vinyl pyrrolidone can be copolymerized.

The vinyl ester component of the EVOH preferably has a saponification degree of 90% or more. The saponification degree of the vinyl ester component is more preferably 95% or more, still more preferably 98% or more, optimally 99% or more. If the saponification degree is less than 90%, thermal stability becomes poor, and a deteriorated substance tends to be generated, which may deteriorate passability. If the EVOH is made of a blend of two or more EVOHs having different saponification degrees, a mean value calculated from the weight ratio is defined as the saponification degree. The ethylene content and saponification degree of the EVOH can be determined by a nuclear magnetic resonance (NMR) method.

The EVOH preferably has an intrinsic viscosity of 0.06 L/g or more. The intrinsic viscosity of the EVOH is more preferably 0.07 L/g to 0.2 L/g, still more preferably 0.075 L/g to 0.15 L/g, particularly preferably 0.080 L/g to 0.12 L/g. If the intrinsic viscosity of the EVOH (A) is less than 0.06 L/g, spinnability, drawability and strength may be lowered. If the intrinsic viscosity of EVOH exceeds 0.2 L/g, spinnability and drawability may be deteriorated and a deteriorated substance may tend to be generated.

The melt flow rate (MFR) of the EVOH (at 190° C., under a load of 2160 g) is suitably 0.1 g/10 min to 30 g/10 min, more suitably 0.3 g/10 min to 25 g/10 min, more suitably 0.5 g/10 min to 20 g/10 min. However, if the melting point is around or above 190° C., the measurement is performed at different temperatures equal to or higher than the melting point under a load of 2160 g, and reciprocals of the absolute temperatures and a logarithms of the MFRs are respectively plotted on horizontal and vertical axes of a semilog graph to represent the MFR as a value extrapolated to 190° C. Two or more EVOHs having different MFRs can also be mixed.

It is important that the monovalent epoxy compound having a molecular weight of 500 or less to be reacted with the EVOH is a monovalent epoxy compound. Specifically, an epoxy compound having only one epoxy group in the molecule has to be used. If a polyvalent epoxy compound having a valence of two or more is used, the advantages of the present invention cannot be exhibited. However, in a production process of the monovalent epoxy compound, a trace amount of a polyvalent epoxy compound may be contained. A monovalent epoxy compound containing a trace amount of a polyvalent epoxy compound may be used as the monovalent epoxy compound having a molecular weight of 500 or less according to the present invention, unless the advantages of the present invention are impaired.

As the monovalent epoxy compound, an epoxy compound having 2 to 8 carbon atoms is particularly preferable. From the viewpoints of easy handling of the compound and reactivity with the EVOH, the number of carbon atoms of the monovalent epoxy compound is preferably 2 to 6, more preferably 2 to 4. From the viewpoints of reactivity with the EVOH and a raw material cost, 1,2-epoxybutane, 2,3-epoxybutane, epoxypropane, epoxyethane, and glycidol are preferable, and among which epoxypropane is more preferable.

Bringing the EVOH and the monovalent epoxy compound to react with each other produces a modified EVOH. In this case, with respect to 100 parts by weight of the EVOH, the monovalent epoxy compound is mixed suitably in a ratio of 1 part by weight to 50 parts by weight, more suitably 2 parts by weight to 40 parts by weight, and particularly suitably 5 parts by weight to 35 parts by weight.

A method of producing the modified EVOH by bringing the EVOH and the monovalent epoxy compound having a molecular weight of 500 or less to react with each other is not particularly limited. Suitable examples of the method include a method of bringing the EVOH and the monovalent epoxy compound to react with each other in a solution, and a method of bringing the EVOH and the monovalent epoxy compound to react with each other in an extruder.

(Modified EVOH Fibers)

It is important that the modified EVOH fibers of the present invention have a crystallinity of 25% to 50%. If the crystallinity is less than 25%, the proportion of an amorphous part of the fibers increases, which deteriorates the spinnability of the obtained fibers, and raises the shrinkage rate of the fibers, resulting in poor dimensional stability of the fiber structure. If the crystallinity is more than 50%, the proportion of a crystalline part of the fibers increases, which disadvantageously causes the obtained fibers to shrink less, and raises a heat treatment temperature for fusion.

Specifically, producing a fiber structure (e.g., woven or knitted fabric) using the modified EVOH fibers having a crystallinity of 25% to 50% makes it possible to ensure a sufficient fusion property through a heat treatment at low temperatures using hot water or steam, provide good dimensional stability, and reduce defects in products caused by troubles such as poor passability in the later steps. The crystallinity of the modified EVOH fibers is preferably 27% or more, more preferably 29% or more. The crystallinity is preferably 45% or less, more preferably 40% or less. Further, the crystallinity of the modified EVOH fibers is calculated by a measurement method described in the examples which will be mentioned later.

The modified EVOH fibers of the present invention preferably have a crystallite size of 30 Å to 50 Å on the (002) plane. If the crystallite size is less than 30 Å, each crystallite present in the fibers grows insufficiently and tends to lose the orientation due to heat, and the shrinkage rate increases, resulting in poor dimensional stability of the fiber structure. If the crystallite size is larger than 50 Å, the crystallites are large in size and poorly dispersed in the fibers, causing great irregularities. As a result, the fibers may fail to shrink uniformly.

Specifically, producing a fiber structure (e.g., woven or knitted fabric) using the modified EVOH fibers having a crystallite size of 30 to 50 Å makes it possible to achieve sufficient fusion through a heat treatment at low temperatures using hot water or steam, and allow the fiber structure to moderately shrink.

The melting point of the modified EVOH fibers is preferably 60° C. to 160° C. More suitably, the melting point is 60° C. to 155° C. The melting point of the modified EVOH being 160° C. or lower makes it possible to lower the spinning temperature, improve the spinnability while keeping the resin from deterioration, and achieve thermal fusion at low temperatures. Further, the melting point being 60° C. or higher can keep the fibers from being fixed to each other even in a high-temperature and high-humidity environment, and can provide the fibers with good storage stability.

The modified EVOH fibers of the present invention may be produced by any method as long as the modified EVOH fibers have the content of the modified component and the crystallinity described above. For example, the modified EVOH fibers of the present invention may be fibers containing a mixture of the modified EVOH and other thermoplastic resins.

In this case, a resin composition containing the modified EVOH and other thermoplastic resins suitably contains 1 wt % to 99 wt % of the modified EVOH and 1 wt % to 99 wt % of the thermoplastic resins. The thermoplastic resin to be blended with the modified EVOH is not particularly limited, and may include EVOH free from the modified structural unit (I), polyolefin, polyamide, polyester, polystyrene, polyvinyl chloride, poly (meth)acrylate, polyvinylidene chloride, polyacetal, polycarbonate, polyvinyl acetate, polyurethane, polyacrylonitrile, and polyketone. Various copolymers may also be used.

Among them, unmodified EVOH free from the structural unit (I) and containing 5 mol % to 55 mol % of ethylene is preferably used as the thermoplastic resin from the viewpoint of compatibility. Kneading the modified EVOH and the unmodified EVOH together can optionally adjust the content of the structural unit (I). The EVOH may be the same as the aforementioned EVOH used as the raw material for the modified EVOH, but is appropriately selected according to the composition of the modified EVOH to be blended and the application of the fibers.

As for the modified ethylene-vinyl alcohol copolymer fibers of the present invention, it is preferable that the resins are unevenly supplied into a resin feed hopper in a melting phase during spinning. Specifically, EVOH pellets (chips) containing a high ratio of the structural unit (I) and unmodified EVOH pellets (chips) containing no structural unit (I) are supplied at any ratio, and are blended. This makes it possible to generate structural irregularities in the fibers, raise the melting point, and reduce fixing between the fibers, thereby improving the storage stability, and increasing the yield through improvement in the spinnability. Further, it is no longer necessary to previously prepare pellets kneaded with any amount of the modified component, which leads to a reduction in production cost.

Various additives may be added to the modified EVOH fibers used in the present invention as needed. Examples of such additives include an antioxidant, a plasticizer, a heat stabilizer, an ultraviolet absorber, an antistatic agent, a lubricant, a colorant, a filler, and other polymer compounds, and these additives can be blended within a range that does not impair the advantages of the present invention.

The modified EVOH fibers of the present invention can be spun by a conventional melt spinning method, for example, by a method of melt spinning the fibers at a low or medium speed, and then drawing the spun threads, a direct spinning and drawing method at a high speed, or a method of simultaneously or successively drawing and false-twisting the spun threads.

Specifically, the modified EVOH resin composition is molten in a melt extruder, and the molten polymer flow is guided to a spinning head, measured by a gear pump, discharged from a spinning nozzle of a desired shape, and if necessary, the spun threads are drawn, and then taken up to produce the fibers of the present invention. The melting temperature during the spinning is appropriately adjusted depending on the melting point of the modified EVOH, and is preferably about 150° C. to 300° C. in general. The threads discharged from the spinning nozzle are taken up at a high speed as they are without drawing, or drawn if necessary. The drawing is usually performed at a temperature equal to or higher than the glass transition point and a draw ratio of 0.55 to 0.9 times the rupture elongation (HDmax). If the draw ratio is less than 0.55 times, the fibers cannot be stably provided with sufficient strength, and if the draw ratio exceeds 0.9 times, the threads tend to break.

The drawing may be carried out after the threads are discharged from the spinning nozzle and taken up once, or after the threads are drawn. In the present invention, either of the drawing methods may be used. The drawing is usually hot drawing, and may be performed using any of hot air, a hot plate, a hot roller, or a water bath. A take-over speed is in the range of approximately 500 m/min to 6000 m/min, although it varies depending on whether the drawing is carried out after the threads are taken up once, the threads are taken up after being spun and drawn in a single step of the direct spinning and drawing method, or the threads are taken up at a high speed without drawing. If the take-over speed is less than 500 m/min, productivity becomes poor, and if the threads are taken up at a very high speed that exceeds 6000 m/min, the fibers tend to break. The cross-sectional shape of the fibers of the present invention is not particularly limited, and may be formed into a perfect circular shape, a hollow shape, or a modified cross-sectional shape by conventional melt spinning. From the viewpoint of fiberization and weaving, the perfect circular shape is preferable.

(Fiber Structure)

The modified EVOH fibers of the present invention can be used as various fiber structures (fiber assemblies). Here, the "fiber structure" may be: a multifilament yarn, a spun yarn, a woven or knitted fabric, a nonwoven fabric, paper, artificial leather, and a padding material which are made of only the modified EVOH fibers of the present invention; a woven or knitted fabric or a nonwoven fabric partially containing the modified EVOH fibers of the present invention, e.g., a woven or knitted fabric using the modified EVOH fibers and other fibers such as natural fibers, chemical fibers, synthetic fibers, or semi-synthetic fibers; a woven or knitted fabric, a cotton-mixed nonwoven fabric, and a fiber laminate which use the modified EVOH fibers as a finished yarn, such as a blended yarn, a combined filament yarn, a twisted yarn, an interlace textured yarn, or a crimped yarn.

EXAMPLES

The present invention will be described in more detail by way of examples, but is not limited to these examples.

Example 1

(Production of Modified EVOH Fibers)

As a modified EVOH resin, an 8 mol % modified EVOH ("EX854" manufactured by Kuraray Co., Ltd.) containing 32 mol % of ethylene and having a saponification degree of 99.9% (provided that in the structural unit (I), $R^1$ and $R^2$ are hydrogen atoms, one of $R^3$ or $R^4$ is a methyl group, and the other is a hydrogen atom) was molten at 220° C. using an extruder, then guided to a spin pack, and discharged from a nozzle with 12 holes each having a diameter of 0.25 mm at a spinneret temperature of 230° C. Thus, fibers were discharged from the spinning nozzle. Threads discharged from the spinneret were cooled using a 1.0 m-long cooling device which blows the air in a transverse direction. Thereafter, a spinning oil made of an antistatic component containing no water and a smoothing component was applied to the threads. Then, the threads were taken up via a roller at a take-over speed of 2000 m/min to obtain modified EVOH fibers of 78 dtex/12f of the present example. Table 1 shows the results of the following evaluation.

(Measurement of Crystallinity)

The crystallinity of the modified EVOH fibers thus produced was measured. The crystallinity of the modified EVOH fibers was measured using the following measurement apparatus under the following measurement conditions.

Measurement apparatus: 2D detector-mounted X-ray diffractometer "D8 Discover with GADDS" manufactured by Bruker AXS Detector: 2D-PSPC "Hi-STAR"

Measurement conditions: current=110 mA, voltage=45 kV, camera distance=15 cm, collimator diameter=0.3 mm, exposure time=1800 sec, 2θ axis=22°, ω axis=11°, χ axis=90° (equator line), 0° (meridian). A single yarn was used as a sample, and the angle of the χ axis was adjusted such that the equator line corresponded to the vertical direction of the sample, and the meridian to the horizontal direction of the sample.

Then, two-dimensional data in the meridional direction obtained by the above method was converted into an X-ray diffraction intensity curve in an azimuthal direction under the following conditions.

2θ=4.5° to 38.0°, χ=−135° to −45°, step width=0.02°

Then, a peak area of the amorphous part and that of the crystalline part were calculated by peak separation under the following conditions from the peaks in the intensity diagram obtained by the above method.

Initial value of amorphous peak: peak position=19.0°, shape constant=0.9, asymmetry=−0.6, half-width=4.74

Crystalline peak: peak position=20.6°, 35.4° (two peaks)

The height, shape constant, and half width of the crystalline peaks were fitted as variables. Subsequently, the height, shape constant, asymmetry, and half width of the amorphous peak were fitted as variables, and then the angles 2θ for all peaks were fitted as variables. The series of fitting was repeated several times to determine the area value of each peak. Based on the obtained peak area values, the crystallinity was calculated by using the following equation (1).

[Math. 1]

$$\text{Crystallinity (\%)} = (\text{crystalline peak area})/(\text{crystalline peak area} + \text{amorphous peak area}) \times 100 \quad (1)$$

(Measurement of Crystallite Size)

The crystallite size of the modified EVOH fibers was measured using the following measurement apparatus under the following measurement conditions.

Measurement apparatus: 2D detector-mounted X-ray diffractometer "D8 Discover with GADDS" manufactured by Bruker AXS Detector: 2D-PSPC "Hi-STAR"

Measurement conditions: current=110 mA, voltage=45 kV, camera distance=15 cm, collimator diameter=0.3 mm, exposure time=1800 sec, 2θ axis=22°, ω axis=11°, χ axis=90° (equator line), 0° (meridian)

A single yarn was used as a sample, and the angle of the χ axis was adjusted such that the equator line corresponded to the vertical direction of the sample, and the meridian to the horizontal direction of the sample.

Then, the crystallite size on the (002) plane was estimated using the diffraction peak observed around the meridional direction 2θ=75 deg obtained by the above method. Specifically, the crystallite size was calculated using the peak value and the half width value in the Scherrer equation.

(Measurement of Melting Point)

In accordance with JIS K 7121, measurement was performed using a differential scanning calorimeter (DSC-60) manufactured by Shimadzu Corporation at a temperature increase rate of 10° C./min. Indium and lead were used for the calibration of the temperature. A melting peak temperature (Tpm) in accordance with the JIS standard was obtained from a chart of the second run, which was regarded as the melting point.

(Spinnability)

Under the spinning conditions of the modified EVOH fibers, the spinnability was evaluated from the number of breaks of the fibers discharged from the nozzle.

Excellent: No break occurred during four-hour running

Good: One or two breaks occurred during four-hour running

Average: Three to five breaks occurred during four-hour running

Poor: Six or more breaks occurred during four-hour running (Storage Stability)

A bobbin that has taken up one kilogram of the modified EVOH fibers thus produced was allowed to stand for two weeks in an environment of a temperature of 60° C. and a humidity of 80%, and then the degree of fixing between fiber bundles was evaluated based on the following criteria.

Excellent: The fiber bundles are not fixed together, and were able to be unwound without snagging Good: The fiber bundles are slightly fixed together, but were able to be unwound without snagging Average: The fiber bundles are fixed together, and snagged during unwinding, but were able to be unwound Poor: The fiber bundles are significantly fixed together, and napped during unwinding, and were unable to be unwound.

(Evaluation of Fusion Property at Low Temperature)

The modified EVOH fibers thus produced and nylon-6 fibers (reduced viscosity: 1.80 dL/g (1 g/dL in orthochlorophenol, 30° C.) of 84 dtex/24f were doubled, and knitted into a circular knitted fabric using a tube knitting machine. The obtained fabric was treated with hot water at 80° C. for ten minutes and steam at 110° C. for a minute, and an unwind strength (unit: mN) was then determined with the following instrument under the following conditions. Thus, the fusion property of the modified EVOH fibers was evaluated. In general, it was determined that the fabric having an unwind strength of 100 mN or more under the following measurement conditions was applicable for general anti-fraying purposes, and the fabric having an unwind strength of 300 mN or more was applicable for any purpose.

Measurement instrument: Tensilon RTG-1250 manufactured by A&D Company Limited

Measurement conditions: chuck interval=50 mm, pulling speed=300 mm/min, n=5

The fusion property was evaluated based on the following criteria.

Excellent: The unwind strength was between 300 mN and measurement limit (not unwound)

Good: The unwind strength was 100 mN or more to less than 300 mN

Poor: The unwind strength was 0 mN or more to less than 100 mN (Shrinkage Rate)

The modified EVOH fibers thus prepared were allowed to stand for 24 hours in an environment of a temperature of 22° C. and a humidity of 65% for humidity control and reeled up, and the length of the yarn measured under a load of 0.3 mg/dtex was then taken as the "yarn length before treatment". Thereafter, the yarn was treated with hot water at 90° C. for 30 minutes under a load of 0.5 mg/dtex, dehydrated and cooled, and then the yarn length measured under a load of 0.3 mg/dtex was taken as the "yarn length after treatment".

Then, the shrinkage rate of the modified EVOH fibers was calculated by the following equation (2). In general, if the shrinkage rate is 80% or less, more preferably 70% or less under the above-described measurement conditions, a fabric with the fibers incorporated therein is provided with good dimensional stability, and if the shrinkage rate is 6% or more, more preferably 8% or more, the fabric with the fibers incorporated therein shrinks, and the fusing fibers make the grain close, thereby improving the fusion performance.

[Math. 2]

$$\text{Shrinkage rate (\%)}=(\text{yarn length before treatment})-\\(\text{yarn length after treatment})/(\text{yarn length before treatment})\times 100 \qquad (2)$$

Example 2

As a modified EVOH resin, 6 mol % modified EVOH ("EX861B" manufactured by Kuraray Co., Ltd.) containing 44 mol % of ethylene and having a saponification degree of 99.9% (provided that in the structural unit (I), $R^1$ and $R^2$ are hydrogen atoms, one of $R^3$ or $R^4$ is a methyl group, and the other is a hydrogen atom) was extruded and taken up in the same manner as in Example 1 to obtain modified EVOH fibers. Table 1 shows the crystallinity, crystallite size, melting point, spinnability, storage stability, fusion property, and shrinkage rate of the obtained fibers evaluated in the same manner as in Example 1.

Example 3

Chips of 6 mol % modified EVOH ("EX861B" manufactured by Kuraray Co., Ltd.) containing 44 mol % of ethylene and having a saponification degree of 99.9% as a modified EVOH resin (component A) and chips of EVOH ("E-112YS" manufactured by Kuraray Co., Ltd.) containing 44 mol % of ethylene and having a saponification degree of 99.9% as an EVOH resin (component B) were blended in a weight ratio of component A:component B=5:1 to produce 5 mol % modified EVOH. The modified EVOH thus obtained was extruded and taken up in the same manner as in Example 1 to obtain modified EVOH fibers. Table 1 shows the crystallinity, crystallite size, melting point, spinnability, storage stability, fusion property, and shrinkage rate of the obtained fibers evaluated in the same manner as in Example 1.

Example 4

Modified EVOH fibers were obtained through extrusion and taking-up of the resin performed in the same manner as in Example 1 except that the chips used in Example 3 were blended in a weight ratio of componentA:componentB=2:1 to obtain 4 mol % modified EVOH. Table 1 shows the crystallinity, crystallite size, melting point, spinnability, storage stability, fusion property, and shrinkage rate of the obtained fibers evaluated in the same manner as in Example 1.

Example 5

Modified EVOH fibers were obtained through extrusion and taking-up of the resin performed in the same manner as in Example 1 except that the modified EVOH (component A) used in Example 3 was replaced with 6 mol % modified EVOH ("EX854" manufactured by Kuraray Co., Ltd.) containing 32 mol % of ethylene and having a saponification degree of 99.9%, and that the chip blending was performed in a weight ratio of component A:component B=2:1 to obtain 4 mol % modified EVOH. Table 1 shows the crystallinity, crystallite size, melting point, spinnability, storage stability, fusion property, and shrinkage rate of the obtained fibers evaluated in the same manner as in Example 1.

Example 6

Using 100 parts by weight of EVOH containing 15 mol % of ethylene and having a saponification degree of 99.9% and 7.4 parts by weight of epoxypropane, modified EVOH (provided that in the structural unit (I), $R^1$ and $R^2$ are hydrogen atoms, one of $R^3$ or $R^4$ is a methyl group, and the other is a hydrogen atom) was obtained through melt kneading, and unreacted epoxypropane was removed. The modified EVOH thus obtained had an ethylene content of 15 mol %, a saponification degree of 99.9%, and 4 mol % of the structural unit (I). The modified EVOH was extruded and taken up in the same manner as in Example 1 to obtain modified EVOH fibers. Table 1 shows the crystallinity, crystallite size, melting point, spinnability, storage stability, fusion property, and shrinkage rate of the obtained fibers evaluated in the same manner as in Example 1.

Example 7

Using 100 parts by weight of EVOH containing 25 mol % of ethylene and having a saponification degree of 99.9% and 7.4 parts by weight of epoxypropane, modified EVOH (provided that in the structural unit (I), $R^1$ and $R^2$ are hydrogen atoms, one of $R^3$ or $R^4$ is a methyl group, and the other is a hydrogen atom) was obtained through melt kneading, and unreacted epoxypropane was removed. The modified EVOH thus obtained had an ethylene content of 25 mol %, a saponification degree of 99.9%, and 4 mol % of the structural unit (I). The modified EVOH was extruded and taken up in the same manner as in Example 1 to obtain modified EVOH fibers. Table 1 shows the crystallinity, crystallite size, melting point, spinnability, storage stability, fusion property, and shrinkage rate of the obtained fibers evaluated in the same manner as in Example 1.

Example 8

Using 100 parts by weight of EVOH containing 50 mol % of ethylene and having a saponification degree of 99.9% and 7.4 parts by weight of epoxypropane, modified EVOH (provided that in the structural unit (I), $R^1$ and $R^2$ are hydrogen atoms, one of $R^3$ or $R^4$ is a methyl group, and the other is a hydrogen atom) was obtained through melt kneading, and unreacted epoxypropane was removed. The modified EVOH thus obtained had an ethylene content of 50 mol %, a saponification degree of 99.9%, and 4 mol % of the structural unit (I). The modified EVOH was extruded and taken up in the same manner as in Example 1 to obtain modified EVOH fibers. Table 1 shows the crystallinity, crystallite size, melting point, spinnability, storage stability, fusion property, and shrinkage rate of the obtained fibers evaluated in the same manner as in Example 1.

Example 9

Modified EVOH fibers were obtained through extrusion and taking-up of the resin performed in the same manner as in Example 1 except that the chips used in Example 3 were blended in a weight ratio of componentA:componentB=1:1 to obtain 3 mol % modified EVOH. Table 1 shows the crystallinity, crystallite size, melting point, spinnability, storage stability, fusion property, and shrinkage rate of the obtained fibers evaluated in the same manner as in Example 1.

Example 10

Modified EVOH fibers were obtained through extrusion and taking-up of the resin performed in the same manner as in Example 1 except that the chips used in Example 3 were blended in a weight ratio of componentA:componentB=1:2 to obtain 2 mol % modified EVOH. Table 1 shows the crystallinity, crystallite size, melting point, spinnability, storage stability, fusion property, and shrinkage rate of the obtained fibers evaluated in the same manner as in Example 1.

Example 11

Modified EVOH fibers were obtained through extrusion and taking-up of the resin performed in the same manner as in Example 1 except that the chips used in Example 3 were blended in a weight ratio of componentA:componentB=1:5 to obtain 1 mol % modified EVOH. Table 1 shows the crystallinity, crystallite size, melting point, spinnability, storage stability, fusion property, and shrinkage rate of the obtained fibers evaluated in the same manner as in Example 1.

Example 12

Using 100 parts by weight of EVOH resin pellets ("E-112YS" manufactured by Kuraray Co., Ltd.) containing 44 mol % of ethylene and having a saponification degree of 99.9% and 7.4 parts by weight of epoxypropane, modified EVOH (provided that in the structural unit (I), $R^1$ and $R^2$ are hydrogen atoms, one of $R^3$ or $R^4$ is a methyl group, and the other is a hydrogen atom) was obtained through melt kneading, and unreacted epoxypropane was removed. The modified EVOH thus obtained had an ethylene content of 44 mol %, a saponification degree of 99.9%, and 4 mol % of the structural unit (I). The modified EVOH thus obtained was extruded and taken up in the same manner as in Example 1 to obtain modified EVOH fibers. Table 1 shows the crystallinity, crystallite size, melting point, spinnability, storage stability, fusion property, and shrinkage rate of the obtained fibers evaluated in the same manner as in Example 1.

Comparative Example 1

EVOH ("E-112YS" manufactured by Kuraray Co., Ltd.) containing 44 mol % of ethylene and having a saponification degree of 99.9% was extruded and taken up in the same manner as in Example 1 to obtain unmodified EVOH fibers. Table 1 shows the crystallinity, crystallite size, melting point, spinnability, storage stability, fusion property, and shrinkage rate of the obtained fibers evaluated in the same manner as in Example 1.

Comparative Example 2

Using 100 parts by weight of EVOH resin pellets ("E-112YS" manufactured by Kuraray Co., Ltd.) containing 44 mol % of ethylene and having a saponification degree of 99.9% and 27.8 parts by weight of epoxypropane, modified EVOH (provided that in the structural unit (I), $R^1$ and $R^2$ are hydrogen atoms, one of $R^3$ or $R^4$ is a methyl group, and the other is a hydrogen atom) was obtained through melt kneading, and unreacted epoxypropane was removed. The modified EVOH thus obtained had an ethylene content of 44 mol %, a saponification degree of 99.9%, and 15 mol % of the structural unit (I). The modified EVOH was extruded and taken up in the same manner as in Example 1 to obtain modified EVOH fibers. Table 1 shows the crystallinity, crystallite size, melting point, spinnability, storage stability, fusion property, and shrinkage rate of the obtained fibers evaluated in the same manner as in Example 1.

Comparative Example 3

Using 100 parts by weight of EVOH containing 3 mol % of ethylene and having a saponification degree of 99.9% and 7.4 parts by weight of epoxypropane, modified EVOH (provided that in the structural unit (I), $R^1$ and $R^2$ are hydrogen atoms, one of $R^3$ or $R^4$ is a methyl group, and the other is a hydrogen atom) was obtained through melt kneading, and unreacted epoxypropane was removed. The modified EVOH thus obtained had an ethylene content of 3 mol %, a saponification degree of 99.9%, and 4 mol % of the structural unit (I). The modified EVOH was extruded and taken up in the same manner as in Example 1 to obtain modified EVOH fibers. The crystallinity, crystallite size, melting point, spinnability, storage stability, fusion property, and shrinkage rate of the obtained fibers were evaluated in the same manner as in Example 1. Table 1 shows the results.

Comparative Example 4

Using 100 parts by weight of EVOH containing 60 mol % of ethylene and having a saponification degree of 99.9% and 7.4 parts by weight of epoxypropane, modified EVOH (provided that in the structural unit (I), $R^1$ and $R^2$ are hydrogen atoms, one of $R^3$ or $R^4$ is a methyl group, and the other is a hydrogen atom) was obtained through melt kneading, and unreacted epoxypropane was removed. The modified EVOH thus obtained had an ethylene content of 60 mol %, a saponification degree of 99.9%, and 4 mol % of the structural unit (I). The modified EVOH was extruded and taken up in the same manner as in Example 1 to obtain modified EVOH fibers. The crystallinity, crystallite size, melting point, spinnability, storage stability, fusion property, and shrinkage rate of the obtained fibers were evaluated in the same manner as in Example 1. Table 1 shows the results.

Comparative Example 3 had a low ethylene content, resulting in poor spinnability. The modified EVOH fibers of Comparative Example 4 had a high ethylene content, resulting in a significantly poor fusion property.

TABLE 1

| | | Fiber | | | | | Evaluation results | | | | |
|---|---|---|---|---|---|---|---|---|---|---|---|
| | Type of polymer | Ethylene content (mol %) | Content of modified component (mol %) | Crystallinity (%) | Crystallite size (Å) | Melting point (° C.) | Spinnability | Storage stability | Fusion bonding property at low temperature (mN) | Evaluation | Shrinkage factor (%) |
| Ex. 1 | Modified EVOH | 32 | 8 | 28.3 | 32 | 103.5 | Good | Good | ML (*) | Excellent | 79.1 |
| Ex. 2 | Modified EVOH | 44 | 6 | 29.7 | 34 | 109.3 | Good | Excellent | ML | Excellent | 69.3 |
| Ex. 3 | Modified EVOH | 44 | 5 | 30.6 | 35 | 133.4 | Excellent | Excellent | ML | Excellent | 35.6 |
| Ex. 4 | Modified EVOH | 44 | 4 | 32.3 | 36 | 149.5 | Excellent | Excellent | ML | Excellent | 16.5 |
| Ex. 5 | Modified EVOH | 32 | 4 | 32.6 | 36 | 149.3 | Excellent | Excellent | ML | Excellent | 16.9 |
| Ex. 6 | Modified EVOH | 15 | 4 | 33.2 | 36 | 150.9 | Good | Excellent | ML | Excellent | 15.2 |
| Ex. 7 | Modified EVOH | 25 | 4 | 32.6 | 36 | 149.3 | Excellent | Excellent | ML | Excellent | 16.9 |
| Ex. 8 | Modified EVOH | 50 | 4 | 32.0 | 36 | 148.0 | Excellent | Excellent | 592 | Excellent | 18.4 |
| Ex. 9 | Modified EVOH | 44 | 3 | 33.5 | 41 | 151.1 | Excellent | Excellent | ML | Excellent | 12.2 |
| Ex. 10 | Modified EVOH | 44 | 2 | 40.1 | 44 | 156.7 | Excellent | Excellent | 546 | Excellent | 8.9 |
| Ex. 11 | Modified EVOH | 44 | 1 | 43.6 | 49 | 160.1 | Excellent | Excellent | 295 | Good | 6.0 |
| Ex. 12 | Modified EVOH | 44 | 4 | 32.3 | 36 | 130.5 | Good | Good | ML | Excellent | 16.4 |
| Com. Ex. 1 | EVOH | 44 | 0 | 51.3 | 60 | 164.4 | Excellent | Excellent | 35.1 | Poor | 5.0 |
| Com. Ex. 2 | Modified EVOH | 44 | 15 | 24.8 | 29 | 95.8 | Average | Poor | ML | Excellent | 97.7 |
| Com. Ex. 3 | Modified EVOH | 3 | 4 | 33.0 | 36 | 153.2 | Poor | Excellent | ML | Excellent | 14.5 |
| Com. Ex. 4 | Modified EVOH | 60 | 4 | 31.9 | 35 | 147.7 | Excellent | Excellent | 62.6 | Poor | 20.0 |

(*) measurement limit

As shown in Table 1, the modified EVOH fibers of Examples 1 to 12 contained 0.1 mol % to 10 mol % of the structural unit (I) and 5 mol % to 55 mol % of ethylene, and had a crystallinity of 25% to 50%. This indicates that the modified EVOH fibers showed a sufficient fusion property. Table 1 also shows that the spinnability and the storage stability were also good, and in particular, the modified EVOH fibers of Examples 3 to 5 and 7 to 11 had better spinnability and storage stability.

The modified EVOH fibers of Example 4 in which irregularities were generated due to the chip blending showed superior spinnability and storage stability as compared to those of Example 12 which did not go through the chip blending. Further, the fibers of Example 4 had a higher melting point than those of Example 12. This indicates that the resin was unevenly present in the fibers, generating irregularities.

On the other hand, the unmodified EVOH fibers of Comparative Example 1 had a crystallinity greater than 50%, resulting in a significantly poor fusion property. Further, the modified EVOH fibers of Comparative Example 2 had a crystallinity less than 25%, resulting in poor spinnability and storage stability. The modified EVOH fibers of

INDUSTRIAL APPLICABILITY

The modified EVOH fibers of the present invention can provide modified EVOH fibers that show a sufficient fusion property at low temperatures, good storage stability in a high-temperature and high-humidity environment, and a moderate shrink property and fusion property that keep a woven or knitted fabric from excessively shrinking at the time of setting of the fabric. In particular, the modified EVOH fibers of the present invention exhibit excellent performance when applied for the purposes of protecting underwear, pantyhoses, liners, and socks from penetration by a sharp object and fraying.

The invention claimed is:

1. A modified ethylene-vinyl alcohol copolymer fiber comprising:
a modified ethylene-vinyl alcohol copolymer containing 0.1 mol % to 10 mol % of the following structural unit (I), and 5 mol % to 55 mol % of ethylene, the modified ethylene-vinyl alcohol copolymer fiber having a crystallinity of 25% to 50%,

wherein R', $R^2$, $R^3$ and $R^4$ represent a hydrogen atom, an aliphatic hydrocarbon group having 1 to 10 carbon atoms, an alicyclic hydrocarbon group having 3 to 10 carbon atoms, or an aromatic hydrocarbon group having 6 to 10 carbon atoms, R', $R^2$, $R^3$ and $R^4$ may be the same as or different from each other, $R^3$ and $R^4$ may be bonded to each other, and R', $R^2$, $R^3$ and $R^4$ may have a hydroxyl group, a carboxyl group, or a halogen atom.

2. The modified ethylene-vinyl alcohol copolymer fiber of claim 1, having a crystallite size of 30 Å to 50 Å.

3. The modified ethylene-vinyl alcohol copolymer fiber of claim 1, having a melting point of 60° C. to 160° C.

4. A fiber structure comprising the modified ethylene-vinyl alcohol copolymer fiber of claim 1.

* * * * *